United States Patent
Gollapudi et al.

(10) Patent No.: US 10,311,119 B1
(45) Date of Patent: Jun. 4, 2019

(54) DETERMINING LOCATION-BASED CONTEXTUAL HASHTAGS

(71) Applicant: Google Inc., Mountain View, CA (US)

(72) Inventors: Sreenivas Gollapudi, Cupertino, CA (US); Alexander Fabrikant, Menlo Park, CA (US); Shanmugasundaram Ravikumar, Berkeley, CA (US)

(73) Assignee: Google LLC, Mountain View, CA (US)

( * ) Notice: Subject to any disclaimer, the term of this patent is extended or adjusted under 35 U.S.C. 154(b) by 766 days.

(21) Appl. No.: 14/832,927

(22) Filed: Aug. 21, 2015

(51) Int. Cl.
  *G06F 16/9537* (2019.01)
  *G06F 16/2457* (2019.01)
  *G06F 16/28* (2019.01)

(52) U.S. Cl.
  CPC .... *G06F 16/9537* (2019.01); *G06F 16/24578* (2019.01); *G06F 16/287* (2019.01)

(58) Field of Classification Search
  CPC .......... G06F 16/9537; G06F 16/24578; G06F 16/287
  See application file for complete search history.

(56) References Cited

U.S. PATENT DOCUMENTS

| | | | | |
|---|---|---|---|---|
| 8,862,593 B1* | 10/2014 | Zureigat | ............. | G11B 27/329 704/276 |
| 2012/0265806 A1* | 10/2012 | Blanchflower | ........ | G06Q 10/10 709/204 |
| 2013/0254227 A1* | 9/2013 | Shim | ................. | G06F 17/30241 707/769 |
| 2014/0040371 A1* | 2/2014 | Gurevich | ................ | H04W 4/21 709/204 |
| 2015/0220806 A1* | 8/2015 | Heller | .................. | G06K 9/4676 382/159 |
| 2017/0169026 A1* | 6/2017 | Nalliah | ............. | G06F 17/30554 |

* cited by examiner

*Primary Examiner* — James Trujillo
*Assistant Examiner* — Hubert Cheung
(74) *Attorney, Agent, or Firm* — IP Spring

(57) ABSTRACT

Implementations generally relate to hashtags. In some implementations, a method includes providing one or more location-based contextual hashtags to a user by receiving, from a first user device associated with a first user, information indicative of a physical location of the first user device. The method further includes identifying, with one or more processors, a place of interest based on the information indicative of the physical location of the first user device. The method further includes determining a category associated with the place of interest. The method further includes retrieving one or more hashtags from one or more databases based on the place of interest or the category associated with the place of interest. The method further includes providing the one or more hashtags and information about the place of interest to the first user device.

20 Claims, 7 Drawing Sheets

DETERMINING LOCATION-BASED CONTEXTUAL HASHTAGS

BACKGROUND

Users of mobile devices benefit from having access to location-specific timely information. Approaches to provide location-specific timely information generally fall into two categories: fixed format and freeform.

A fixed format approach allows users to contribute updates to metadata relevant to a pre-defined geographic entity in a well-defined scheme. For example, a user may be able to correct a business's opening hours or post an upcoming special event on a business's calendar.

A freeform approach includes mining locally- and temporally-relevant information from unstructured geocoded social streams. For example, trends may be detected in social posts geolocated to a certain neighborhood.

SUMMARY

Implementations generally relate to hashtags. In some implementations, a method includes providing one or more location-based contextual hashtags to a user by receiving, from a first user device associated with a first user, information indicative of a physical location of the first user device. The method may further include identifying, with one or more processors, a place of interest based on the information indicative of the physical location of the first user device. The method may further include determining a category associated with the place of interest. The method may further include retrieving one or more hashtags from one or more databases based on the place of interest or the category associated with the place of interest. The method may further include providing the one or more hashtags and information about the place of interest to the first user device.

In some implementations, the method may further include generating a ranked set of the hashtags wherein providing the one or more hashtags includes providing the one or more hashtags from the ranked set of the hashtags. The one or more hashtags may include user queries from one or more other users that are provided when other user devices associated with the one or more other users are within a threshold distance from the physical location and wherein generating the ranked set of hashtags is based on a frequency of the user queries. In some implementations, the method may further include identifying a recency of the user queries and identifying a trend based on the recency and the frequency of the user queries, wherein generating the ranked set of hashtags is further based on the trend. The one or more hashtags may include a historical user query provided by the first user at least two different times when the first user device is within a threshold distance from the physical location and wherein providing the one or more hashtags may include providing information about the historical user query. The method may further include generating the one or more hashtags based on user input that includes a specified format.

In some implementations, the method may further include generating a user interface that receives a custom place of interest defined by the first user. The method may further include generating a user interface that includes a button that, upon selection, allows the first user to define a new hashtag that is stored as one of the one or more hashtags. The method may further include sharing the social post with one or more other users of the social network that are associated with the first user. The method may further include receiving a user query from the first user that includes a request to search the hashtags for search results that match at least part of the hashtags and generating a search results page that includes search results that are ordered based on matches between the user query and the hashtags.

In some implementations, a method to generate a database of hashtags relevant to a place of interest may include receiving information to identify a physical location for a place of interest and a category of the place of interest, determining an automatic hashtag based on the category, determining one or more manual hashtags based on a social post in a social network from a first user that provided the social post when a first user device associated with the first user is within a first threshold distance from the physical location, determining one or more query hashtags based on a user query from a second user when a second user device associated with the second user is within a second threshold distance from the physical location, and storing in the database information about the place of interest, the category, the automatic hashtag, the one or more manual hashtags, and the one or more query hashtags.

In some implementations, the method may further include determining an action hashtag based on an action performed by the first user when the first user device is within the first threshold distance from the physical location. Determining the one or more query hashtags may be based on identifying similar user queries and designating the one or more query hashtags as representative of the user query from the second user and the similar user queries. The method may further include determining a pattern based on a timestamp associated with the one or more query hashtags and generating a pattern hashtag based on the pattern. The pattern may be further based on sentiment analysis of the user query. Determining the one or more manual hashtags may further be based on the first user providing the social post on behalf of the place of interest.

In some implementations, an apparatus to provide one or more location-based contextual hashtags to a user may include means for receiving, from a first user device associated with a first user, information indicative of a physical location of the first user device, means for identifying a place of interest based on the information indicative of the physical location of the first user device, means for determining a category associated with the place of interest, means for retrieving one or more hashtags from one or more databases based on the place of interest or the category associated with the place of interest, and means for providing the one or more hashtags and information about the place of interest to the first user device. The apparatus may further include means for generating a ranked set of the hashtags, wherein providing the one or more hashtags includes providing the one or more hashtags from the ranked set of the hashtags. In some implementations, the one or more hashtags include user queries from one or more other users that are provided when one or more other user devices associated with the one or more other users are within a threshold distance from the physical location and wherein generating the ranked set of hashtags is based on a frequency of the user queries. The apparatus may further include means for identifying a recency of the user queries, means for identifying a trend based on the recency and the frequency of the user queries, wherein generating the ranked set of hashtags is further based on the trend. In some implementations, the one or more hashtags include a historical user query provided by the first user at least two different times when the first user device is within a threshold distance from the physical location and wherein providing the one or more hashtags includes providing information about the historical user query. In some implementations, the place of interest associated with the physical location includes at least one of a geographic location, a point of interest from a dataset, a user-submitted location, and a political boundary.

Other aspects may include corresponding methods, systems, apparatus, and computer program products.

The system and methods described below advantageously provide users with a way to discover real-time information about a particular location. For example, instead of traditional systems where users do not have a strong incentive to post about a specific topic, in the description below users may receive push notifications or search for real-time information about places of interest.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
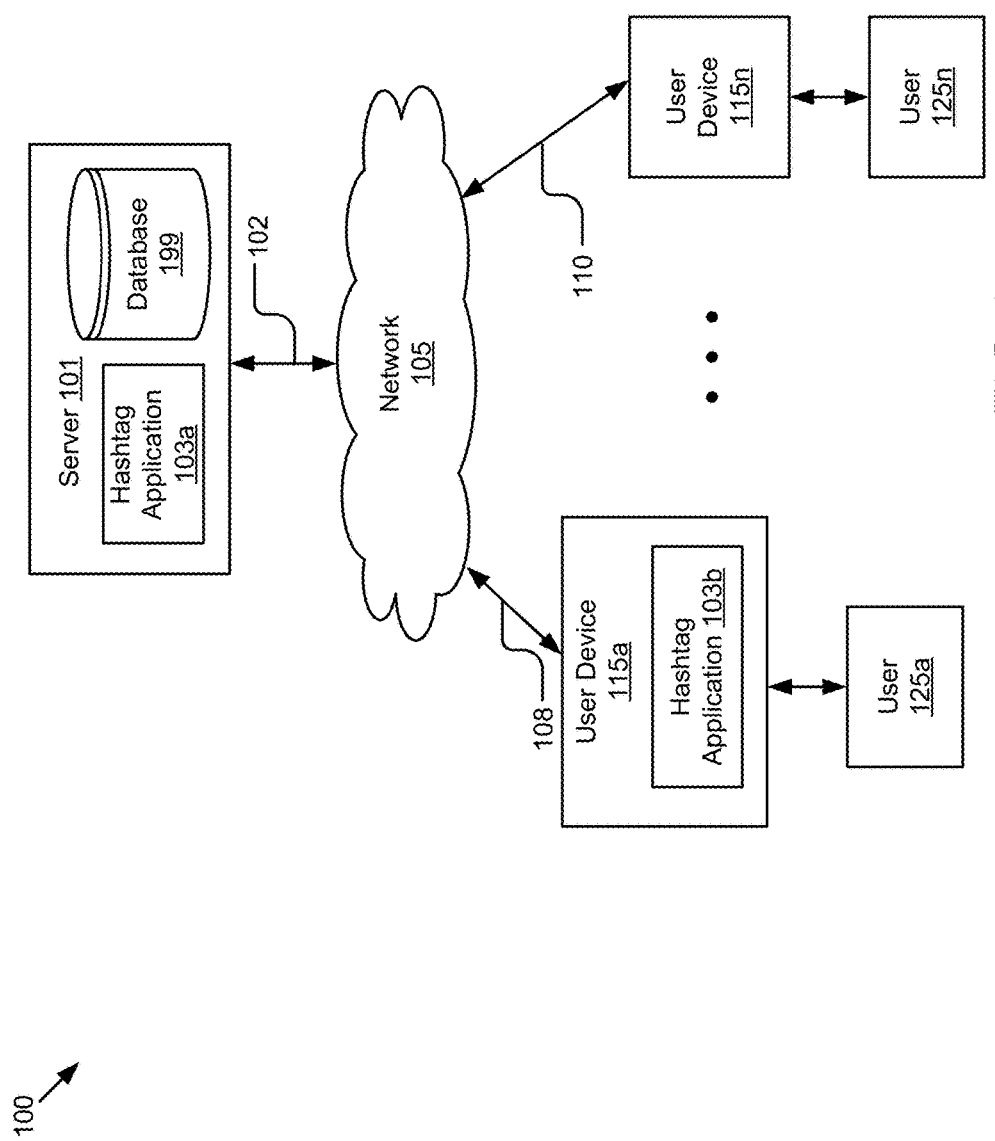
FIG. 1 illustrates a block diagram of an example system that determines location-based contextual hashtags.

Some implementations may include a system and method to generate a database of location-based contextual hashtags. The hashtags may be associated with a place of interest that is described based on a physical location and a category where the category may describe a purpose associated with the place of interest. For example, the place of interest may be Main St. Bar as described by the street address for Main St. Bar where the category is bar.

Exemplary hashtags may include, but are not limited to, an automatic hashtag, a manual hashtag, and a query hashtag. An exemplary automatic hashtag may be based on a category associated with, for example, the physical location. For example, the automatic hashtags for a bar may include hours of operation (#openFrom10toClose) and drink specials (#$2martini). An exemplary manual hashtag may be based on a social post in a social network from a first user that provided the social post when a first user device associated with the first user was within a threshold distance from the physical location. For example, the manual hashtag may include #tooCrowded based on the first user providing a social post about how the Main St. Bar is too crowded. An exemplary query hashtag may be based on a user query from a second user when a second user device associated with the second user is within a threshold distance from the physical location. For example, the query hashtag may include #openRightNow based on the second user providing a user query that states "which bars are open right now?" where the Main St. Bar is currently open. The hashtags may be stored in one or more databases in association with information about the place of interest, such as the name, the physical location of the place of interest, and the category.

Some implementations may also include a system and method to provide one or more location-based contextual hashtags to a user. A first user device associated with a first user may provide information indicative of a physical location of the first user device. For example, the first user device may provide global positioning system (GPS) coordinates for Main St. Grocery. A place of interest may be identified based on the information. For example, Main St. Grocery may be identified based on the GPS coordinates. A category associated with the place of interest may be identified. For example, Main St. Grocery may be identified as a grocery store.

One or more hashtags may be retrieved from one or more databases based on the place of interest or the category associated with the place of interest. For example, #diapersOnSale and #outOfOJ may be retrieved where the place of interest is Main St. Grocery or another place of interest in the category of grocery store. The one or more hashtags and information about the place of interest may be provided to the first user device. For example, the #diapersOnSale and #outOfOJ may be displayed on a user interface for a user to post a social post on a social network about Main St. Grocery. In another example, the first user may search for stores near the first user device and receive a search results page that lists the Main St. Grocery Store along with the #diapersOnSale and #outOfOJ hashtags.

Some advantages may include an ability to notify users about real-time events. For example, users may use the hashtags to identify a bar where they can order a drink special, a restaurant where they can be seated within a short period of time, a sale, product inventory, etc. The advantages may also include identifying information that users may find helpful. Yet another advantage may be making information denser, more geographically and socially relevant, and more available to users.

Example System

FIG. 1 illustrates a block diagram of an example system 100 that determines location-based contextual hashtags. The illustrated system 100 includes a server 101, user devices 115a-115n and a network 105. Users 125a-125n may be associated with respective user devices 115a-115n. In some implementations, the system 100 may include other servers or devices not shown in FIG. 1. For example, the system 100 may include a separate social network server, an email server, etc. In FIG. 1 and the remaining figures, a letter after a reference number, e.g., "115a," represents a reference to the element having that particular reference number. A reference number in the text without a following letter, e.g., "115," represents a general reference to implementations of the element bearing that reference number.

In the illustrated implementation, the entities of the system 100 are communicatively coupled via a network 105. The network 105 may be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, wireless access port (WAP), email, etc. Although FIG. 1 illustrates one network 105 coupled to the user devices 115 and the server 101, in practice one or more networks 105 may be coupled to these entities.

The server 101 may be a hardware server that includes a processor, a memory and network communication capabilities. The server 101 is communicatively coupled to the network 105 via signal line 102. In some implementations, the server 101 sends and receives data to and from one or more of the user devices 115a-115n via the network 105. The server 101 may include a hashtag application 103a and a database 199.

The hashtag application 103a may be code and routines configured to determine location-based contextual hashtags and provide the location-based contextual hashtags to users 125. In some implementations, the hashtag application 103a may be implemented using hardware including a field-programmable gate array (FPGA) or an application-specific integrated circuit (ASIC). In some other implementations, the hashtag application 103a may be implemented using a combination of hardware and software. In some implementations, the hashtag application 103a may be stored in a combination of the devices and servers, or in one of the devices or servers.

The database 199 may store hashtags generated by a hashtag application 103, such as the hashtag application 103a stored on the server 101 or the hashtag application 103b stored on the user device 125a. The database 199 may also store social network data associated with users 125, maps, location information, places of interest, etc.

The user device 115 may be a computing device that includes a memory and a processor, for example a laptop computer, a desktop computer, a tablet computer, a mobile telephone, a wearable device, a head-mounted display, a mobile email device, a portable game player, a portable music player, a reader device, a television with one or more processors embedded therein or coupled thereto, or other electronic device capable of accessing a network 105.

In the illustrated implementation, user device 115a is coupled to the network 105 via signal line 108 and user device 115n is coupled to the network 105 via signal line 110. User devices 115a, 115n are accessed by users 125a, 125n, respectively. The user devices 115a, 115n in FIG. 1 are used by way of example. While FIG. 1 illustrates two user devices, 115a and 115n, the disclosure applies to a system architecture having one or more user devices 115.

In some implementations, the user device 115 can be a mobile device that is included in a wearable device worn by the user 125. For example, the user device 115 is included as part of a clip (e.g., a wristband), part of jewelry or part of a pair of glasses. In another example, the user device 115 can be a smart watch. The user 125 can view notifications from the hashtag application 103 on a display of the device worn by the user 125. For example, the user 125 can view the notifications on a display of a smart watch or a smart wristband. The user 125 may also configure what types of notifications to be displayed on the device worn by the user 125. For example, the user 125 may configure the wearable device to blink for 5 seconds before it performs an action based on patterns identified from user activity.

In some implementations, the hashtag application 103b may be stored on a user device 115a. The hashtag application 103 may include a thin-client hashtag application 103b stored on the user device 115a and a hashtag application 103a that is stored on the server 101. For example, the hashtag application 103a may be a web application that generates web pages viewable by the user device 115a using the hashtag application 103b. In various implementations, the hashtag application 103 may include a mobile application that runs on the user device 115a and sends information to the hashtag application 103a stored on the server 101. The hashtag application 103a stored on the server 101 may process the information and send additional information back to the hashtag application 103b stored on the user device 115a.

In some implementations, the hashtag application 103 may be a standalone application stored on the server 101. A user 125a may access the web pages using a browser or other software on the user device 125a. In this implementation, the hashtag application 103b stored on the user device 115a may receive instructions from the hashtag application 103a stored on the server 101 to display information generated by the hashtag application 103a. In some other implementations, the hashtag application 103 may include the same components on the user device 115a as are included on the server 101.

Example Computing Device

Figure 2:
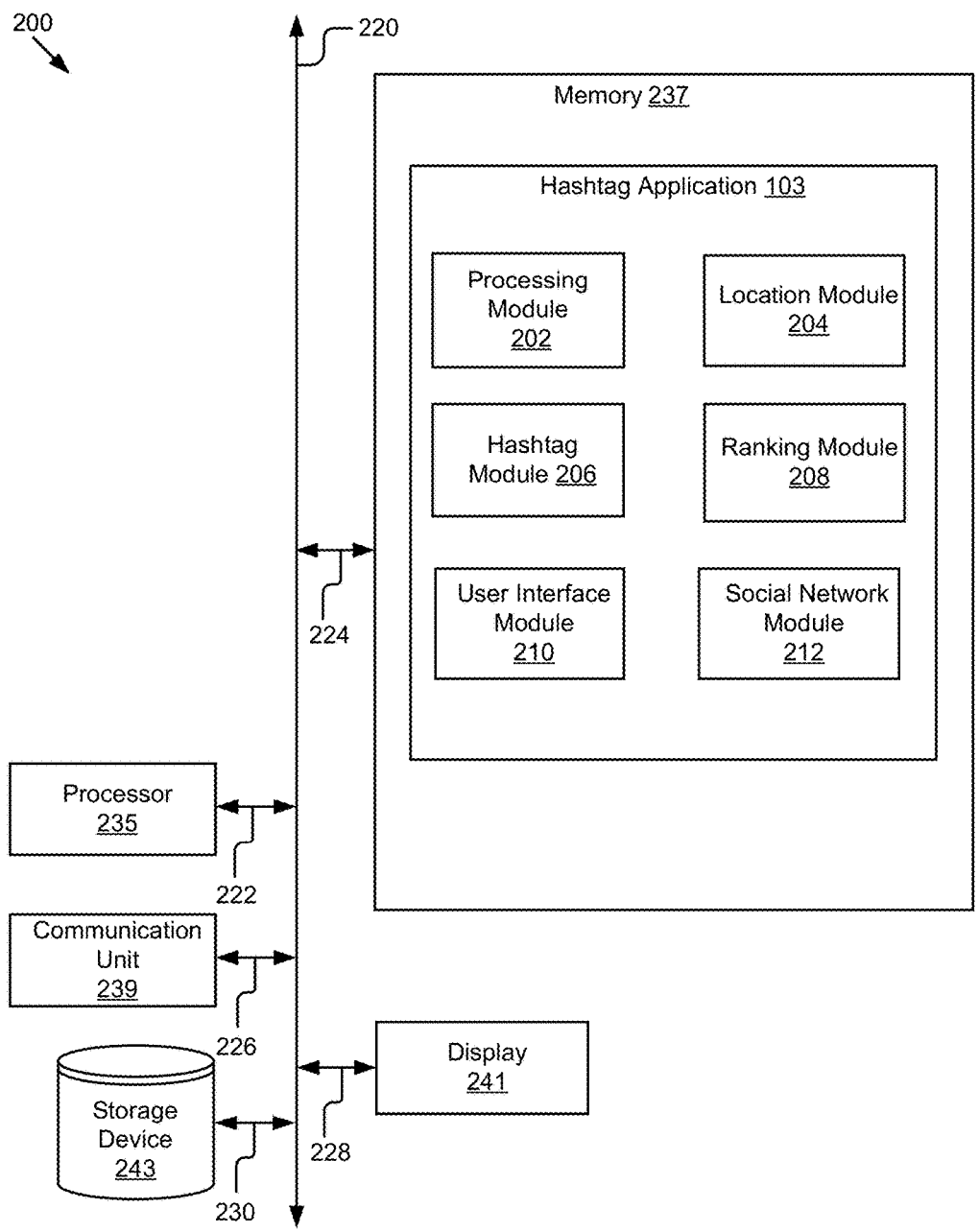
FIG. 2 illustrates a block diagram of an example computing device that determines location-based contextual hashtags.

FIG. 2 illustrates a block diagram of an example computing device 200 that determines location-based contextual hashtags. The computing device 200 may be a server 101 or a user device 115. The computing device 200 may include a hashtag application 103, a processor 235, a memory 237, a communication unit 239, a display 241, and a storage device 243. The components of the computing device 200 are communicatively coupled by a bus 220.

The processor 235 includes an arithmetic logic unit, a microprocessor, a general purpose controller or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations are possible. The processor 235 is coupled to the bus 220 for communication with the other components via signal line 222.

The memory 237 stores instructions that may be executed by the processor 235 and/or data. The instructions may include code for performing the techniques described herein. The memory 237 may be a dynamic random access memory (DRAM) device, a static RAM, or some other memory device. In some implementations, the memory 237 also includes a non-volatile memory, such as a (SRAM) device or flash memory, or similar permanent storage device and media including a hard disk drive, a floppy disk drive, a compact disc read only memory (CD-ROM) device, a DVD-ROM device, a DVD-RAM device, a DVD-RW device, a flash memory device, or some other mass storage device for storing information on a more permanent basis. The memory includes code and routines configured to execute the hashtag application 103, which is described in greater detail below.

The memory 237 is coupled to the bus 220 for communication with the other components via signal line 224.

The communication unit 239 transmits and receives data to and from at least one of the user device 115 and the server 101 depending upon where the hashtag application 103 may be stored. In some implementations, the communication unit 239 includes a port for direct physical connection to the network 105 or to another communication channel. For example, the communication unit 239 includes a universal serial bus (USB), secure digital (SD), category 5 cable (CAT-5) or similar port for wired communication with the user device 115 or the server 101, depending on where the hashtag application 103 may be stored. In some implementations, the communication unit 239 includes a wireless transceiver for exchanging data with the user device 115, server 101, or other communication channels using one or more wireless communication methods, including IEEE 802.11, IEEE 802.16, Bluetooth® or another suitable wireless communication method. The communication unit 239 is coupled to the bus 220 for communication with the other components via signal line 226.

In some implementations, the communication unit 239 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some implementations, the communication unit 239 includes a wired port and a wireless transceiver. The communication unit 239 also provides other conventional connections to the network 105 for distribution of files and/or media objects using standard network protocols including TCP/IP, HTTP, HTTPS and SMTP, etc.

The display 241 may include hardware configured to display graphical data received from the hashtag application 103. For example, the display 241 may render graphics to display a user interface that is configured to generate a social post that includes location-based contextual hashtags. The display 241 is coupled to the bus 220 for communication with the other components via signal line 228. Other hardware components that provide information to a user may be included as part of the computing device 200. For example, the computing device 200 may include a speaker for audio interfaces, a vibration or force feedback device, or other types of non-display output devices.

The storage device 243 may be a non-transitory computer-readable storage medium that stores data that provides the functionality described herein. In implementations where the computing device 200 is the server 101, the storage device 243 may include the database 199 in FIG. 1. The storage device 243 may be a DRAM device, a SRAM device, flash memory or some other memory devices. In some implementations, the storage device 243 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The storage device 243 is coupled to the bus 220 for communication with the other components via signal line 230.

In the illustrated implementation shown in FIG. 2, the hashtag application 103 includes a processing module 202, a location module 204, a hashtag module 206, a ranking module 208, a user interface module 210, and a social network module 212. Other modules and/or configurations are possible.

The processing module 202 may be configured to receive and transmit data. In some implementations, the processing module 202 may be a set of instructions executable by the processor 235 to receive and transmit data. In some implementations, the processing module 202 may be stored in the memory 237 of the computing device 200 and can be accessible and executable by the processor 235.

The processing module 202 may transmit data between components of the computing device 200. For example, the processing module 202 may transmit data received from the communication unit 239 to the display 241. The processing module 202 may also transmit data between modules within the hashtag application 103. For example, the processing module 202 may receive data describing a location of a user device 125 from the communication unit 239 and transmit the information to the location module 204.

In some implementations, the processing module 202 saves data from different sources in the storage device 243. For example, the processing module 202 may receive a hashtag generated by the hashtag module 206 and store it in the storage device 243. The processing module 202 may also receive data stored in the storage device 243 and provide it to the user device 115 or the server 101 in response to receiving a request. For example, the processing module 202 may provide a hashtag stored in the storage device 243 in response to a request from the server 101.

In the instance where a user consents to the use of such data, the location module 204 may be configured to determine a physical location of a user device 115 and a place of interest associated with the physical location. In some implementations, the location module 204 may be a set of instructions executable by the processor 235 to determine the location of the user device 115 and the place of interest. In some implementations, the location module 204 may be stored in the memory 237 of the computing device 200 and may be accessible and executable by the processor 235.

The location module 204 may receive information indicative of a physical location from a user device 115. For example, the location module 204 may receive GPS coordinates and determine the physical location of the user device 115 from the GPS coordinates. In various implementations, the location module 204 may receive wireless data and determine the location of the user device 115 from the wireless data, such as through signal triangulation, using an internet protocol (IP) address of the user device 115, nearby Wi-Fi hotspots, etc.

The location module 204 may determine one or more places of interest associated with the physical location of the user device 115. A place of interest may be a point or boundary in physical space that includes a geographic location (e.g., based on coordinates, street names, etc.), a point of interest from a dataset, a user-submitted location, or a political boundary (e.g., a political entity's definition of a country, e.g., the borders of Ukraine according to Russia or according to the Ukraine). One physical location may be associated with multiple places of interest. For example, a ski resort may include an entrance for ski lift, a beginning of ski slopes, a restaurant, and a location where an instructor teaches ski lessons. In some implementations, the location module 204 instructs the user interface module 210 to generate a user interface that includes multiple places of interest so that a user may select one or more of the places of interest. In some implementations, the location module 204 may generate a list of the multiple places of interest based on a category, a time, a date, user-specific characteristics, etc. The location module 204 may also determine nearby places of interest. For example, the location module 204 may determine that the user device 115 is at a first restaurant, determine other nearby restaurants, and determine a highway close to the first restaurant.

The location module 204 may determine the place of interest from information indicative of a physical location using the storage device 243 or the database 199 of FIG. 1 to identify places of interest within proximity to the physical location of the user device 115. In various implementations, the location module 204 may communicate with a map application stored on a server (e.g., server 101 or another server not illustrated in FIG. 1) to determine the place of interest by providing the information indicative of the physical location to the server. The location module 204 may determine the place of interest based on the place of interest being within a predetermined threshold from the physical location of the user device 115. For example, the location module 204 may associate a playground with a physical location based on the GPS coordinates of the physical location being within (or close to) boundaries of the playground as defined by GPS data. In another example, a restaurant may be associated with a physical location based on a threshold distance (e.g., within two miles or within a five minute walk from the user device 115). In yet another example, a store may be associated with a physical location based on accurate indoor position data, such as that determined with beacon-based or other indoor position systems.

In some implementations, the location module 204 may determine a category associated with the place of interest. The category may describe a purpose associated with the place of interest. For example, the category may describe a type of store, a type of government building, a type of entertainment activity provided by the place of interest, or a type of landmark associated with the place of interest. The location module 204 may determine multiple categories associated with the place of interest.

The hashtag module 206 may be configured to determine hashtags. In some implementations, the hashtag module 206 may be a set of instructions executable by the processor 235 to determine the hashtags. In some implementations, the hashtag module 206 may be stored in the memory 237 of the computing device 200 and may be accessible and executable by the processor 235.

The hashtags may be received from a variety of different sources and stored in the storage device 243 as being associated with a place of interest. In the instance where the user consents to the use of such data, the hashtag module 206 may determine the hashtags by receiving information from users and converting the information into hashtags. The hashtags may provide information particular to a user, information particular to a category associated with place of interest, and/or information particular to the place of interest. Below are examples of different types of hashtags.

In certain examples, the hashtag module 206 may determine an automatic hashtag based on a category associated with a place of interest. If the category is a brick and mortar store, the automatic hashtag may include hours of operation, information about events taking place at the store, promotions at the store, etc. For example, if the category is a bar, the automatic hashtags may include #opentill2am, #livemusic, #microbrew, and #$2dollarmartini. If the category is an outdoor location, the automatic hashtag may include weather updates, types of people and/or animals allowed at the location, important updates, hours of operation, etc. For example, if the category is an outdoor park, the hashtags may include #isRaining, #sunny, #dogFriendly, #closedForMemorialDay, etc.

In certain examples, the hashtag module 206 may determine manual hashtags from text that includes hashtags. In the instance where the user consents to the use of such data, the text may be posted on a social network, sent in the form of a text message to a number that is used for manual hashtags, sent as a text message to other users and identified by the hashtag module 206 to include as a manual hashtag, etc. In certain cases, hashtags may be identified within the text by a specified format. In one format, hashtags may be identified by the # sign that is prefixed to a word or phrase. In other examples, other characters may be used. In some examples, no characters may be used, but words or phrases may be hyperlinked and hyperlinked phrases may be considered as hashtags. In some examples, hashtags may be in the form of a suffix to a phrase. Other forms of hashtags may be possible. In some implementations, the hashtag module 206 may generate a manual tag from text provided by a user. For example, the hashtag module 206 may use neurolinguistic programming (NLP) or other machine learning programming to determine terms from the text to use in a manual hashtag, such as by determining terms associated with the location or category, looking for adjectives that are associated with the location or category, etc.

The manual hashtags may be a way to update other users in real-time about conditions at a place of interest. For example, the manual hashtags may include users providing #tooloud from a bar, #saleonshoes from a store, #touchdown or #interception from a football stadium, or a hashtag about technology announcements from a conference hall where a technology conference is being hosted.

In the instance where the user consents to the use of such data, the hashtag module 206 may identify manual hashtags from social posts. For example, the hashtag module 206 may convert a social post that states "Got a great rebate on a monitor at Computer Store X" to the hashtag #monitorRebateComputerStoreX. In another example, the hashtag module 206 may convert a social post that states "Listening to Artist Y at Main St. Bar" to the hashtag #livemusic.

The hashtag module 206 may identify manual hashtags from social posts generated by the social network module 212. The social posts may be from users within a threshold distance from a physical location associated with a point of interest. For example, the threshold distance may be a default setting of 0.05 miles, 0.10 miles, 0.50 miles, 1.0 miles, etc. or configurable by a user. The hashtag module 206 may retrieve social posts from users that are connected to a first user in the social network. This may help ensure that the manual hashtags are relevant to the first user. In some implementations, the hashtag module 206 may identify manual hashtags from social posts generated by other social networks. For example, the hashtag module 206 may query blogs, microblogs, forums, etc. for social posts from users that are within a threshold distance from a point of interest.

In some implementations, the hashtag module 206 receives manual hashtags from a user associated with the place of interest. For example, the user may provide a social post on behalf of a place of interest because the user works at the place of interest. In another example, where the place of interest is Yellowstone, the hashtag module 206 may receive #geyserGoingOff from a docent at Yellowstone to alert tourists about the real-time attraction.

In some implementations, the hashtag module 206 may receive manual hashtags from sensors. For example, the hashtag module 206 may receive a manual hashtag from a thermostat wirelessly connected to the internet that sends information about the temperature, such as #90degreesOutside, #tooHot, #raining, etc.

The hashtag module 206 may determine pattern hashtags that are based on the manual hashtags. The hashtag module 206 may analyze the manual hashtags to determine a pattern, retrieve additional information about the pattern, and generate a pattern hashtag based on the pattern and the additional information. The pattern many be based on a timestamp and a frequency of manual hashtags from a place of interest. For example, the hashtag module 206 may receive manual hashtags from users at 4 p.m. every Wednesday at Main St. Yoga including "Diandra is the best," "feel the burn," and "love today's session." The hashtag module 206 may determine that Diandra teaches "Hot Yoga" from 3 to 4 p.m. every Wednesday at Main St. Yoga and determine that the pattern hashtag should be #DiandrasHotYoga3pmWed.

The hashtag module 206 may also determine the pattern hashtag based on a sentiment of the manual hashtags. The hashtag module 206 may determine the sentiment by performing sentiment analysis. For example, sentiment analysis may be performed by comparing terms in the manual hashtags to a list of words associated with a particular sentiment. For example, a positive sentiment may be determined from the following words: great, awesome, wonderful, best, love, and amazing. A negative sentiment may be determined from the following words: awful, worst, terrible, and no good. Continuing with the example above, based on the positive sentiment associated with Diandra's hot yoga class, the hashtag module 206 may determine that the pattern hashtag is #recommendDiandrasHotYoga.

In the instance where the user consents to the use of such data, the hashtag module 206 may determine query hashtags. The hashtag module 206 may receive user queries when user devices 115 are within a threshold distance from the physical location associated with the place of interest. For example, the hashtag module 206 may receive a user query for "next bus to New York" from a bus stand. In various implementations, the hashtag module 206 may receive user queries that include the place of interest as part of the query from user devices 115. The hashtag module 206 may receive the user query from different applications on the user device 115 including a search application, a map application, a social network, a shopping application, etc.

The hashtag module 206 may convert a portion or all of the user query to a query hashtag based on whether the user query is a keyword search or a natural language search. For example, the hashtag module 206 may convert both the keyword search "ice cream specials" and the natural language search "are there any ice cream specials?" into #iceCreamSpecials.

The hashtag module 206 may group similar user queries with the same hashtags. The hashtag module 206 may identify similar user queries and designate a query hashtag as representative of the similar user queries. For example, the hashtag module 206 may receive the following user queries when user devices 115 are near a movie theater (e.g., within a threshold distance from the movie theater): "what movies are playing," "what shows are playing," "movie showtimes." The hashtag module 206 may determine that the query hashtag associated with the user queries is #nowPlaying. The data used to identify similar user queries may be treated so that no personally identifiable information can be determined for the users.

The hashtag module 206 may determine query hashtags for a place of interest based on query hashtags determined for similar places of interest. For example, the hashtag module 206 may receive user queries from users searching for a popular book in stock at a particular bookstore, determine the query hashtag based on the user queries, and associate the query hashtag with other bookstores in the area.

The hashtag module 206 may determine an action hashtag based on an action performed by a user 125 when a user device 115 associated with the user 125 is within a threshold distance from a physical location associated with a place of interest. The hashtag module 206 may determine the action based on receiving information from sensors that are part of the user device 115 indicative of the user's activity. The hashtag module 206 may determine information that may be helpful to a user performing the determined activity. For example, the hashtag module 206 may determine based on GPS, a pedometer, a gyroscope, or a user 125 activating a particular application on a phone (e.g., a fitness-related application) that the user 125 accesses when the user 125 is at Maple Park in Palo Alto, Calif. The hashtag module 206 may identify a weather report for the user's 125 physical location and determine the action hashtag to be #chanceOfRain based on the weather report.

The ranking module 208 may be configured to rank hashtags. In some implementations, the module 208 may be a set of instructions executable by the processor 235 to rank the hashtags. In some implementations, the module 208 may be stored in the memory 237 of the computing device 200 and may be accessible and executable by the processor 235.

In some implementations, the ranking module 208 generates a ranked set of hashtags by scoring the different hashtags. The ranking module 208 may score the hashtags based on a scale (0-1, 1-100, etc.) where a low number is associated with an unimportant hashtag and a high number is associated with an important hashtag. Other scoring metrics are possible. The ranking module 208 may generate the ranked set of hashtags based on recency, frequency, timing, reliability, or a combination of the different factors. In various implementations, the ranking module 208 may apply a weight to different types of hashtags or based on an importance associated with a hashtag. The weights may be based on a personalized profile or based on a weighting for all users. For example, the ranking module 208 may determine that query hashtags are more important to a user than manual hashtags.

The ranking module 208 may rank a hashtag based on timing considerations. For example, the ranking module 208 may rank #isOpen as important for restaurants before 6 p.m. and bars after 1 a.m. The ranking module 208 may determine timing considerations based on a pattern. For example, the ranking module 208 may determine timing considerations based on the pattern associated with the pattern hashtag for #recommendDiandrasHotYoga that the hashtag should be displayed before the 3 p.m. yoga class. As a result, the ranking module 208 may rank the pattern hashtag to be more important at 2:50 p.m. than at 3:30 p.m. on Wednesday. The ranking module 208 may determine timing considerations based on public information associated with the place of interest. For example, the ranking module 208 may determine that a road is scheduled for maintenance during a certain time period. The ranking module 208 may rank #roadClosed as important during that time period.

The ranking module 208 may determine a recency associated with a hashtag. For example, the ranking module 208 may determine that users provided manual hashtags about a #saleOnDiapers at Main St. Grocery within the last two hours. Because of the timeliness of the sale, the ranking module 208 may determine that #saleOnDiapers ranks higher than other hashtags. In another example, the ranking module 208 may determine that a user recently submitted a user query about directions to Main St. Grocery. As a result, the ranking module 208 may determine that the user would be interested in viewing a query hashtag that links to directions to Main St. Grocery more than other hashtags.

The ranking module 208 may determine a frequency associated with a hashtag associated with a place of interest. For example, #freedom or #ladyliberty may be used frequently by different users near the Statue of Liberty. The ranking module 208 may assign a higher ranking to frequently manual hashtags. As a result users may be able to determine popular places of interest in an area based on the frequent manual hashtags. The ranking module 208 may determine a frequency associated with hashtags related to particular categories. For example, the ranking module 208 may determine that #craftbeer is a popular manual hashtag for bars. As a result, the ranking module 208 ranks #craftbeer as more important when the user is at a bar than when the user is at a sit-down restaurant.

The ranking hashtag module 206 may determine, responsive to user authorization, the frequency for a historical user query provided by a user at least two times in association with a place of interest. For example, the ranking module 208 may determine that because a user submits the user query "directions to Mountain View" each time the user is at the Oakland Airport and the user has submitted the user query five times in the last year, the query hashtag #directionstoMV should have a higher ranking than other hashtags when the user is at the Oakland Airport. The ranking hashtag module 206 may instruct the user interface module 210 to generate information about the historical user query and include it as part of the query hashtag. Continuing with the example, the query hashtag #directionstoMV may be a clickable link to obtain directions to Mountain View.

The ranking module 208 may determine a trend based on one or more of the recency, the frequency, and the timing of manual hashtags and query hashtags. The trend may include an identification of popular hashtags or unpopular hashtags. For example, the ranking module 208 may determine that a particular bar is associated with a #toocrowded hashtag on Friday nights. As a result, the ranking module 208 may rank #toocrowded higher on Friday nights to alert a user about the condition at the bar.

The ranking module 208 may determine a reliability associated with hashtags and rank the hashtags based on the reliability. For example, the ranking module 208 may determine that sensors are a reliable source of manual hashtags and, therefore, rank manual hashtags from sensors higher than manual hashtags from other sources. In another example, the ranking module 208 may determine that a user associated with a place of interest is reliable based on a number of manual hashtags provided by the user from the place of interest, the user being identified as an employee of the place of interest, the user being identified as an expert on a social network, etc. For example, a docent at Yellowstone may post manual hashtags for #geyserGoingOff each time a geyser erupts and, as a result, the ranking module 208 identifies the docent as a reliable source and ranks the #geyserGoingOff hashtag as important.

The user interface module 210 may be configured to provide information to a user. In some implementations, the user interface module 210 can be a set of instructions executable by the processor 235 to provide the functionality described below for providing information to a user. In some implementations, the user interface module 210 can be stored in the memory 237 of the computing device 200 and can be accessible and executable by the processor 235.

The user interface module 210 may receive one or more hashtags from the hashtag module 206. The user interface module 210 may generate information to provide the one or more hashtags to a user device 115. For example, the user interface module 210 may transmit graphical information to be rendered on the user device 115, audio information to be played on the user device 115, haptic information to vibrate on the user device 115, etc. The user interface module 210 may transmit the one or more hashtags via the communication unit 239 to the user device 115. In some implementations, the user interface module 210 provides the one or more hashtags from a ranked set of hashtags depending on space limitations within the user interface, user preferences, etc.

In some implementations, the user interface module 210 provides information about a place of interest and corresponding hashtags. For example, the user interface module 210 may generate a user interface that prompts a user to create a social post where the social post includes hashtags about the place of interest and share the social post on a social network managed by the social network module 212. In another example, the user interface module 210 may generate a user interface that includes a list of places of interest at or near a physical location corresponding to a user device 115 and information about the places of interest including distance from the user, recent pictures, social information about other users that may have visited the places of interest, links to websites for the places of interest, etc.

The user interface module 210 may generate hashtags that may link to additional information including a link to a corresponding place of interest or information referenced by the hashtag. For example, where a user provides a user query asking about directions to Main St. Grocery and the query hashtag is #directionsToMainStGrocery, the hashtag may link to a webpage that provides directions to Main St. Grocery or an application configured to provide directions to Main St. Grocery.

The user interface module 210 may generate fields configured to allow a user to provide input. For example, a user interface may include a field configured to receive a user query from a user. The user interface module 210 may transmit the user query to a search engine, receive search results corresponding to the user query, and generate a search results page. The user query may include a request to search the hashtags for search results that match at least part of the hashtags. For example, the user may provide the following user input into the field: #stillOpen as a user query for restaurants that are still open after 10 p.m. The user interface module 210 may query the storage device 243 for matching hashtags that match at least part of the user query. Continuing with the example, the matching hashtags may include #stillOpen as provided recently by a user at a restaurant, #openTillClose as an automatic hashtag associated with a restaurant, #open30moreMinutes, etc. The user interface module 210 may generate a search results page that includes search results that are ordered by the ranking module 208 based on matches between the user query and the hashtags. Continuing with the example, the user interface module 210 may generate a search results page with #stillOpen as the first result because it matches the user exactly. The user interface module 210 may also accept content in the field that is used to restrict search results based on a place of interest, a set of places of interest, or a category.

In some implementations, the user interface may include a field configured to receive a new hashtag that is stored as a hashtag in the storage device 243. In some implementations, the user interface may include a field configured to receive a custom place of interest. The new place may be temporary or permanent. The custom place of interest may be associated with a particular event or a particular group of people and, as a result, the custom place of interest may not be accessible after the event is over or the custom place of interest may only be accessible to the group of people. For example, people on a work retreat to a ski resort may define a custom place of interest as Company A Work Retreat that is accessible during the work retreat and expires after the work retreat is over. This may be useful for the people associated with the work retreat to use to place of interest as a way to see hashtags related to the work events at the ski resort.

The user interface module 210 may generate objects that, upon selection by a user, perform an action. For example, the user interface module 210 may generate a button, an icon, or a link that enables a user to add a manual hashtag, subscribe to a hashtag, etc. In response to a user selecting a button, an icon, or a link to subscribe to a hashtag, the user interface module 210 may provide the user with notifications about the hashtag (e.g., a pattern of people providing a manual version of the hashtag, changes to the conditions associated with the hashtag, etc.).

Figure 3:
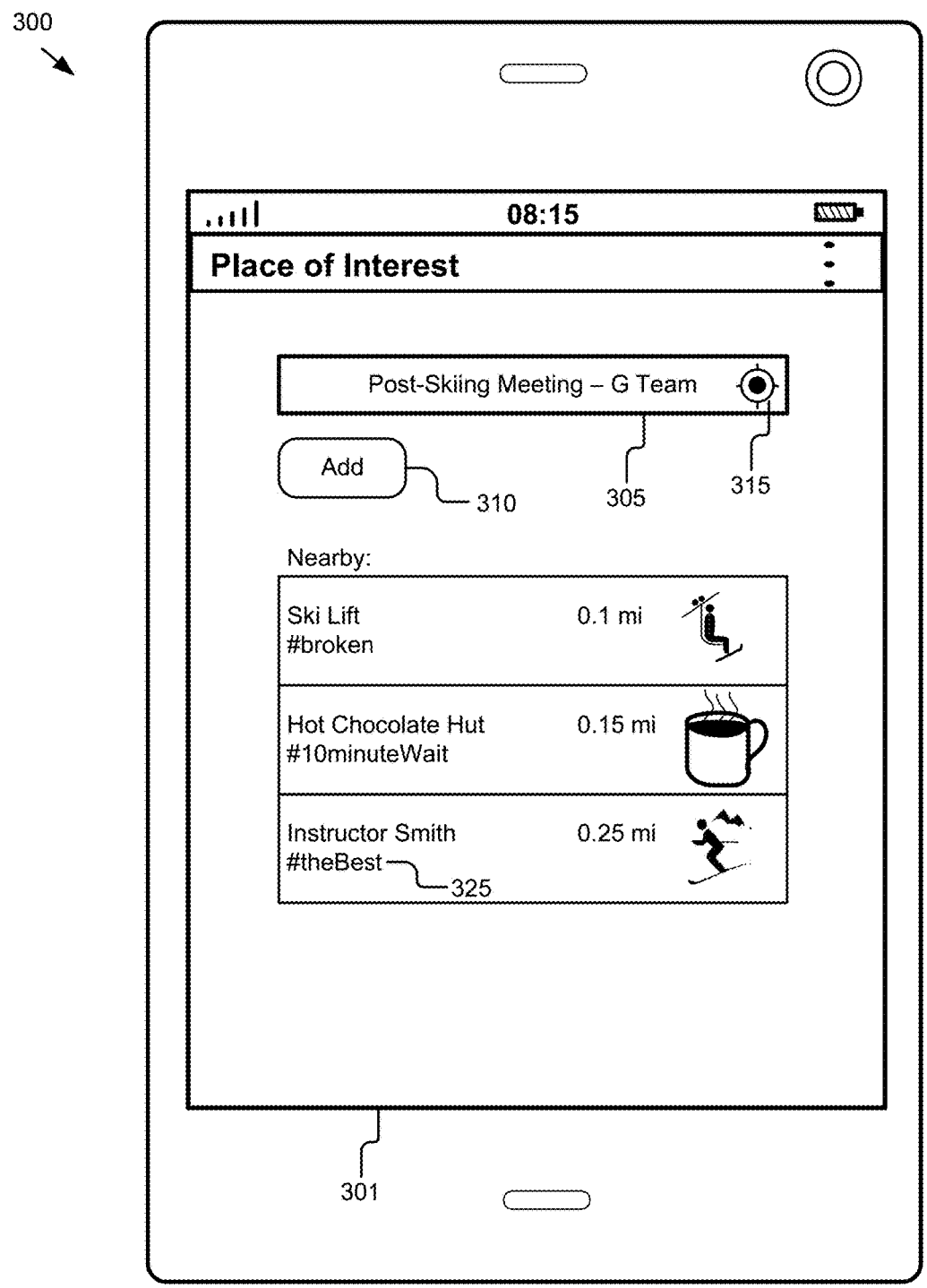
FIG. 3 illustrates a graphic representation of an example user interface configured to add a user-defined place of interest.
Figure 4:
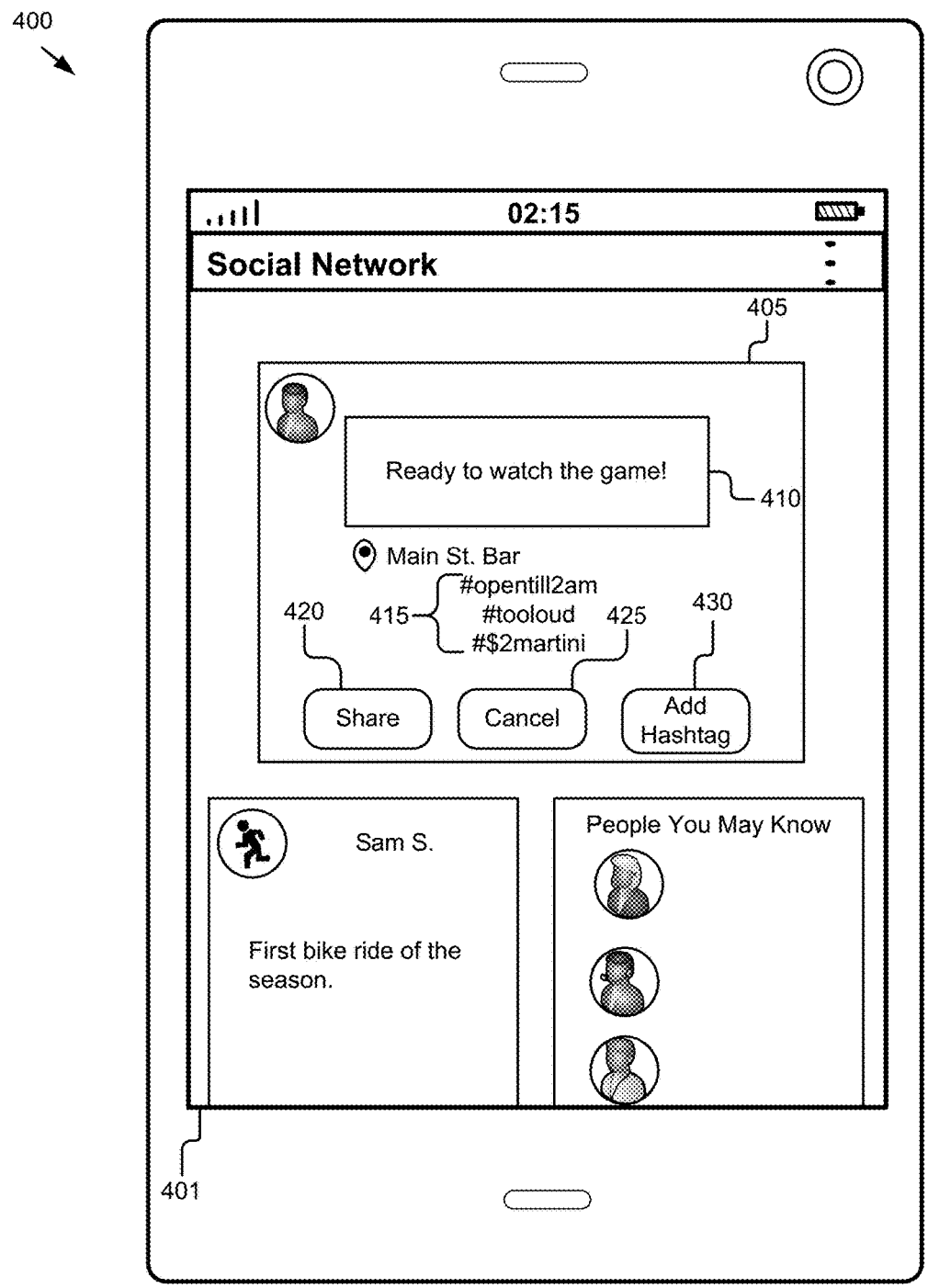
FIG. 4 illustrates a graphic representation of an example user interface configured to display ranked hashtags as part of a social post.
Figure 5:
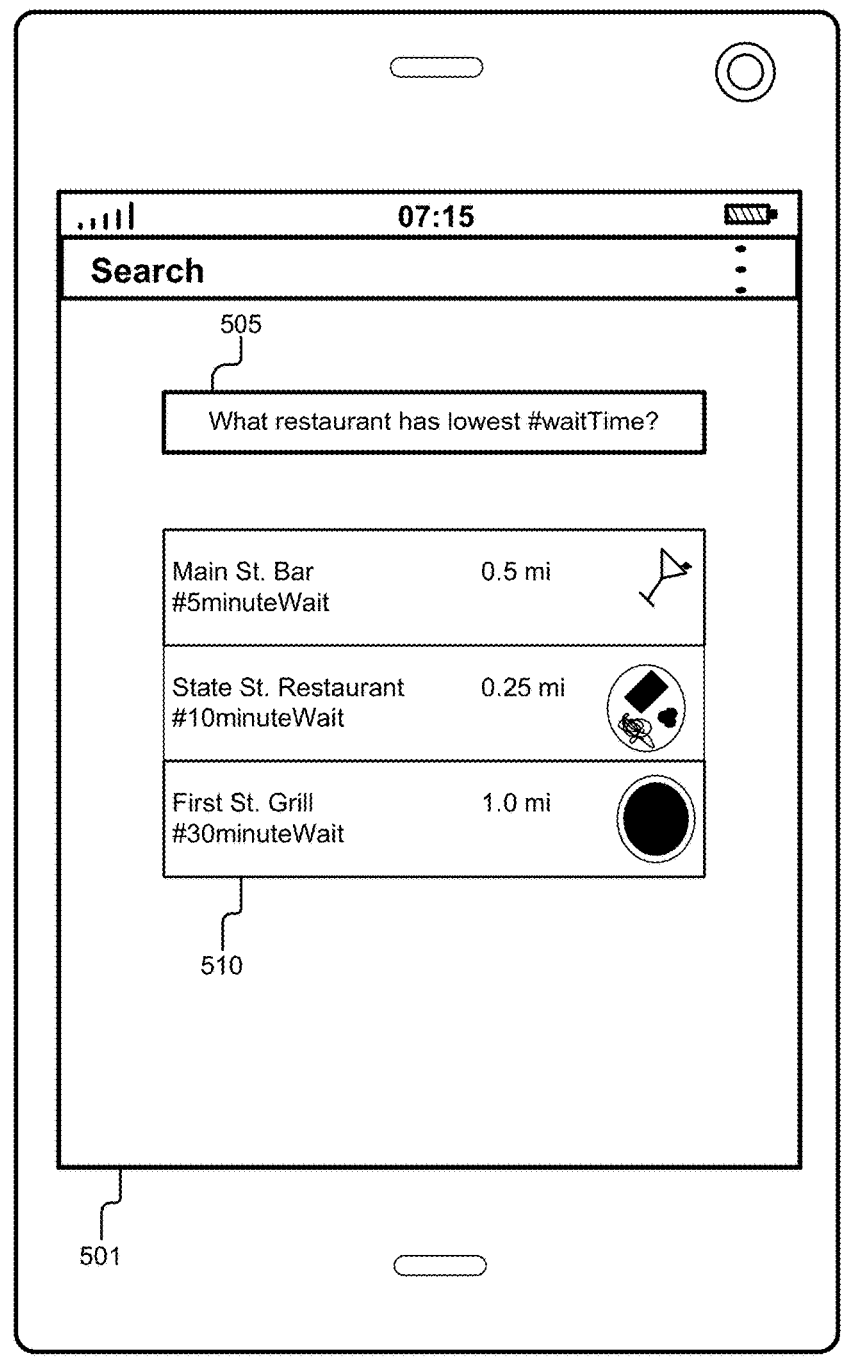
FIG. 5 illustrates a graphic representation of an example user interface configured to receive a hashtag search from a user and display ranked search results that are ranked based on the hashtags.

In some implementations, the user interface module 210 generates graphical data and sends the graphical data to a user device 115, causing the user device 115 to display a user interface to the user. Example user interfaces are shown in FIGS. 3-5.

The social network module 212 may be configured to manage a social network. In some implementations, the social network module 212 may be a set of instructions executable by the processor 235 to manage the social network. In some implementations, the social network module 212 may be stored in the memory 237 of the computing device 200 and may be accessible and executable by the processor 235. In some implementations, the social network module 212 excluded from the hashtag application 103.

A social network can be a type of social structure where the users may be connected by a common feature. The common feature may include relationships/connections, e.g., friendship, family, work, an interest, etc. The common features may be provided by one or more social networking systems including explicitly defined relationships and relationships implied by social connections with other online users, where the relationships form a social graph that may be stored in the storage device 243. In some examples, the social graph can reflect a mapping of these users and how they can be related. As a result, the social network may encompass, for example, social network applications, mail applications, chat applications, and search applications.

In the instance where the user consents to the use of such data, the social network module 212 may receive user input via the user interface module 210 and hashtags from the hashtag module 206 or ranked hashtags from the ranking module 208 and generate a social post for a social network. The social network module 212 may manage user permissions and preferences and provide the social post to users with permission to view the social post.

In some implementations, the social network module 212 may generate a user profile for a user that includes user online behavior including how a user behaves on a mail application, a search application, and a social network (including the social network generated by the social network module 212 or other social networks stored on separate servers). The behavior may include user profiles generated by other sources, indications of approval and/or disapproval (like, dislike, thumbs up, thumbs down, +1, −1, etc.), a list of users and/or groups that a user follows, a user's activities, etc.

Example Graphical User Interfaces

FIG. 3 illustrates a graphic representation 300 of an example user interface 301 configured to add a user-defined place of interest. In this example, a user interface module 210 provides a user interface 301 to a user with a field 305 that is configured to receive input. The input may include a search for a place of interest or a user-defined place of interest. A user may add a user-defined place of interest to the places of interest by selecting the "Add" button 310. In this example, a user adds a place of interest called "Post-Skiing Meeting—G Team," which is a meeting place for people that are part of a work retreat.

The user interface module 210 may generate search results for nearby places of interest in response to a user selecting an icon 315. The user interface module 210 may generate search results based on a distance of a place of interest from a user device 115 associated with the user 125. In this example the search results include an entrance to ski lift that is 0.1 miles away from the user, a restaurant that is 0.15 miles away from the user, and an instructor teaching location that is 0.25 miles away from the user. In this example, the user interface module 210 selects a ranked hashtag to display in association with each place of interest. The hashtag for the instructor 325 may be a pattern hashtag that is generated from different similar manual hashtags about Instructor Smith. The pattern hashtag may also be based on sentiment analysis that identifies Instructor Smith as a great instructor.

FIG. 4 illustrates a graphic representation 400 of an example user interface 401 configured to display hashtags as part of a social post 405. The user interface module 210 generates a social post that includes a field 410 where a user has entered "Ready to watch the game!" The user interface module 210 includes the "Main St. Bar" as the place of interest and three hashtags 415 from a ranked set of hashtags as generated by the hashtag module 206 or provided by users. The ranking module 208 may rank the hashtags based on timing, frequency, and recency. For example, a user may have recently searched for bars that are still open, #tooloud may be a popular manual hashtag for this bar, and the hashtag module 210 may have associated the automatic hashtag #$2martini based on the place of interest (Main St. Bar) being a bar and after identifying drink specials from an online menu associated with Main St. Bar.

The user may share the social post to a social network generated by the social network module 212 by selecting the "Share" button 420. The user may cancel the social post by selecting the "Cancel" button 425. The user may add a hashtag by selecting the "Add Hashtag" button 430. Upon selection of the "Add Hashtag" button 430, the user interface module 210 may generate a field configured to accept a user-defined hashtag from the user.

FIG. 5 illustrates a graphic representation 500 of an example user interface 501 configured to receive a hashtag search from a user and display ranked search results that are ranked based on the hashtags. The user interface 501 includes a field 505 configured to receive a user query. The user query includes a hashtag search as indicated by the hashtag "#waitTime." The user interface module 210 searches the hashtags for search results 510 that match at least part of the hashtags. The hashtag module 208 organizes the search results 510 based on matches between the user query and the hashtags. Specifically, the hashtag module 208 organizes the search results 510 based on the restaurant with the lowest wait time.

Example Methods

Figure 6:
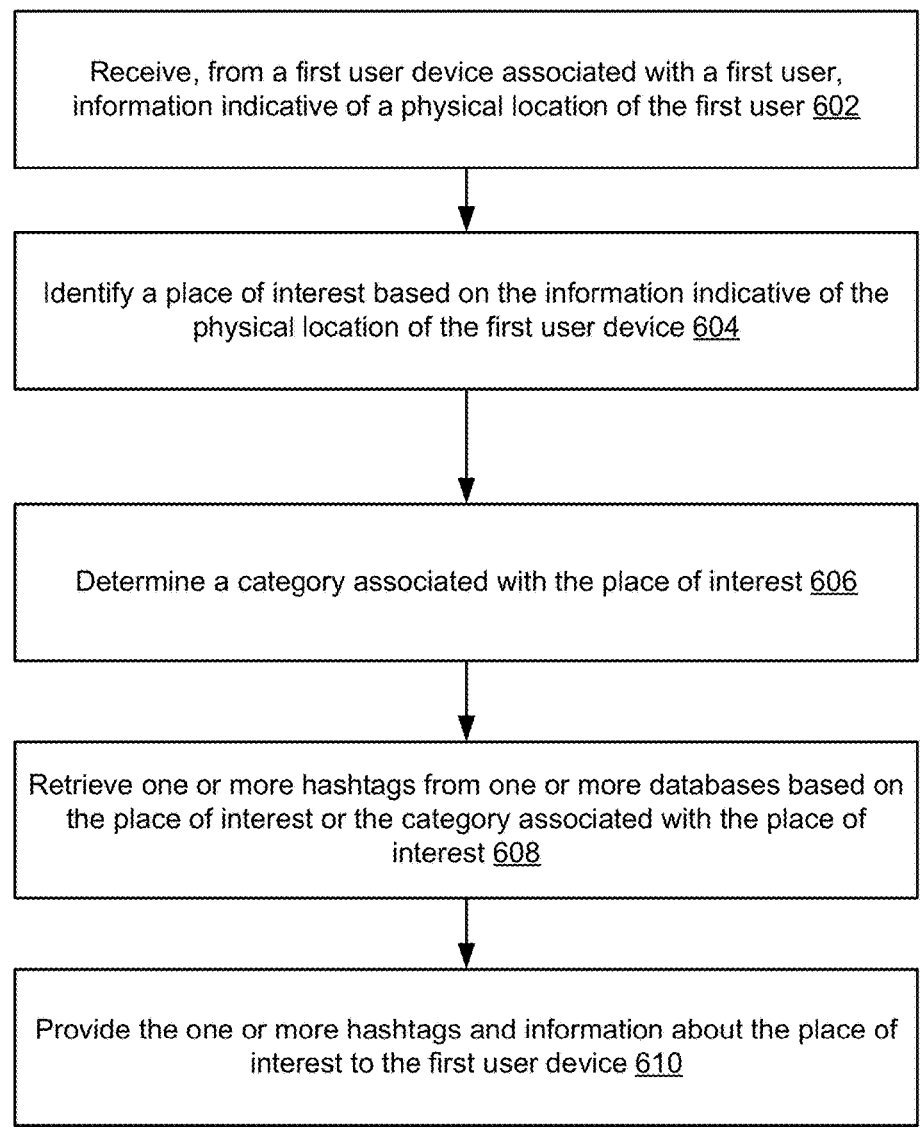
FIG. 6 illustrates a flowchart of an example method to provide location-based contextual hashtags.

FIG. 6 illustrates a flowchart of an example method 600 to provide location-based contextual hashtags. The method 600 may be implemented using the hashtag application 103 illustrated in FIG. 1. The hashtag application 103 may include the location module 204, the hashtag module 206, and the user interface module 210 illustrated in FIG. 2.

At block 602, a first user device associated with a first user may receive information indicative of a physical location of the first user. For example, the location module 204 may receive, from the first user device 115 of FIG. 1, information indicative of a physical location of the first user device 115. At block 604, a place of interest may be identified based on the information indicative of the physical location of the first user device. For example, the location module 204 may identify the place of interest based on the information indicative of the physical location of the first user device 115 by sending the information indicative of the physical location of the first user device to the server 101 and receiving a list of places of interest from the server 101 or retrieving a local cache of places of interest.

At block 606, a category may be determined to be associated with the place of interest. For example, the hashtag module 204 may determine the category associated with the place of interest. At block 608, one or more hashtags may be retrieved from one or more databases based on the place of interest or the category associated with the place of interest. For example, the hashtag module 204 may retrieve the one or more hashtags from the storage device 243 of FIG. 2 or the database 199 of FIG. 1 based on the place of interest or the category associated with the place of interest.

At block 610, the one or more hashtags and information about the place of interest may be provided to the first user device. For example, the user interface module 210 may provide the one or more hashtags and information about the place of interest to the first user device 115.

While blocks 602 to 610 are illustrated in a particular order, other orders are possible with intervening steps. In addition, blocks may be added, skipped, or combined.

Figure 7:
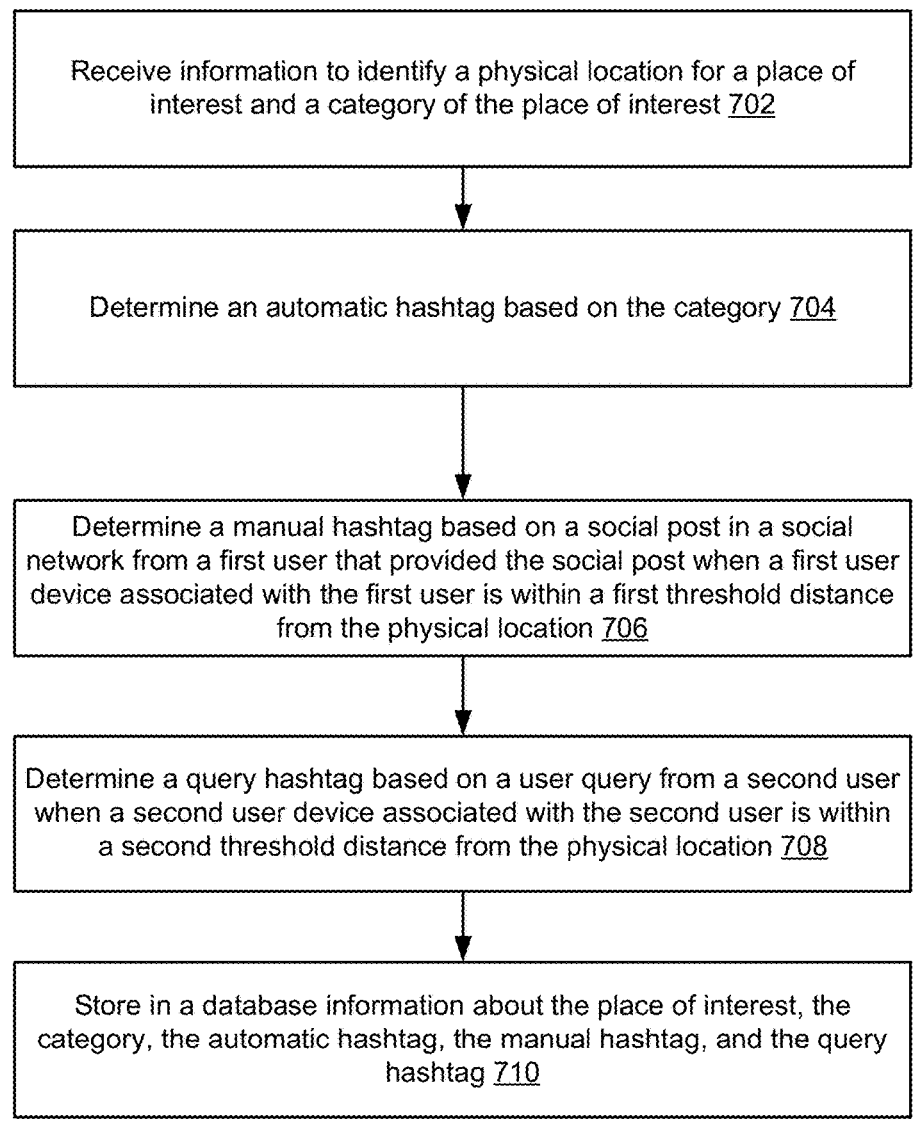
FIG. 7 illustrates a flowchart of an example method to generate a database of location-based contextual hashtags.

FIG. 7 illustrates a flowchart of an example method to generate a database of location-based contextual hashtags. The method may be implemented using the hashtag application 103 illustrated in FIG. 1. The hashtag application 103 may include a location module 204 and a hashtag module 206.

At block 702, information is received to identify a physical location for a place of interest and a category of the place of interest. For example, the location module 204 receives information to identify a physical location for a place of interest and a category of the place of interest.

At block 704, an automatic hashtag is determined based on the category. For example, the hashtag module 206 determines the automatic hashtag based on the category. More than one automatic hashtag may be determined. Automatic hashtags may be determined based on factors in addition to category, such as time, day, season, recency, frequency, etc. Further, an automatic hashtag may be determined based on the place of interest itself (e.g., MoMA may have specific hashtags in addition to generate hashtags for the museum). At block 706, a manual hashtag is determined based on a social post in a social network from a first user that provided the social post when a first user device associated with the first user is within a first threshold distance from the physical location. For example, the hashtag module 206 determines the manual hashtag based on a social post in a social network from the first user 125a of FIG. 1 that provided the social post when the first user device 115a of FIG. 1 associated with the first user is within a second threshold distance from the physical location. The first threshold and the second threshold may be the same or different. For example, the manual hashtag may be associated with a smaller threshold than the query hashtag because the manual hashtag should be from people with personal knowledge of the conditions at a place of interest. At block 708, a query hashtag is determined based on a user query from a second user when a second user device associated with the second user is within a threshold distance from the physical location. For example, the hashtag module 206 determines the query hashtag based on the user query from the second user 125n of FIG. 1 when the second user device 115n of FIG. 1 is within a threshold distance from the physical location. At block 710, information about the place of interest, the category, the automatic hashtag, the manual hashtag, and the query hashtag are stored in a database. For example, the hashtag module 206 stores information about the place of interest, the category, the automatic hashtag, the manual hashtag, and the query hashtag in the storage device 243.

While blocks 702 to 710 are illustrated in a particular order, other orders are possible with intervening steps. In addition, blocks may be added, skipped, or combined.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the implementations can be described above primarily with reference to user interfaces and particular hardware. However, the implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The implementations of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including floppy disks, optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

In situations in which the systems discussed above collect personal information, the systems provide users with an opportunity to control whether programs or features collect user information (e.g., information about a user's social network, social actions or activities, profession, a user's preferences, or a user's current location), or control whether and/or how to receive content from the server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the server.

What is claimed is:

1. A computer-implemented method to provide one or more location-based contextual hashtags, the computer-implemented method comprising:
    receiving, from a first user device associated with a first user, information indicative of a physical location of the first user device;
    identifying, with one or more processors, a place of interest based on the information indicative of the physical location of the first user device;
    determining a category associated with the place of interest;
    retrieving hashtags from one or more databases based on the place of interest or the category associated with the place of interest, wherein one or more of the hashtags describe one or more events that are time sensitive;
    generating a ranked set of hashtags from the hashtags, wherein the hashtags in the ranked set of hashtags are organized based on the one or more events that are time sensitive; and
    providing the ranked set of hashtags and information about the place of interest to the first user device, wherein the ranked set of hashtags are displayed in a user interface.

2. The computer-implemented method of claim 1, wherein the one or more hashtags that describe the one or more events that are time sensitive indicate that the one or more events are time sensitive by describing a duration of time that each of the one or more events is available or a current status of the one or more events.

3. The computer-implemented method of claim 1, wherein:
    the hashtags include user queries from one or more other users that are provided when one or more other user devices associated with the one or more other users are within a threshold distance from the physical location; and
    generating the ranked set of hashtags is further based on a frequency of the user queries.

4. The computer-implemented method of claim 3, further comprising:
    identifying a recency of the user queries;
    identifying a trend based on the recency and the frequency of the user queries; and
    wherein generating the ranked set of hashtags is further based on the trend.

5. The computer-implemented method of claim 1, wherein:
    the hashtags include a historical user query provided by the first user at least two different times when the first user device is within a threshold distance from the physical location; and
    providing the hashtags includes providing information about the historical user query.

6. The computer-implemented method of claim 1, further comprising generating the hashtags based on user input that includes a specified format.

7. A computer-implemented method to generate a database of hashtags relevant to a place of interest, the computer-implemented method comprising:
    receiving information to identify a physical location for a place of interest and a category of the place of interest;

determining an automatic hashtag based on the category, wherein the automatic hashtag describes a time-sensitive event;

determining one or more manual hashtags based on a social post in a social network from a first user that provided the social post when a first user device associated with the first user is within a first threshold distance from the physical location;

determining one or more query hashtags based on a user query from a second user when a second user device associated with the second user is within a second threshold distance from the physical location;

storing in a database information about the place of interest, the category, the automatic hashtag, the one or more manual hashtags, and the one or more query hashtags; and generating a ranked set of hashtags from the database, wherein the ranked set is organized based on the time-sensitive event.

8. The computer-implemented method of claim 7, further comprising:

determining an action hashtag based on an action performed by the first user when the first user device is within the first threshold distance from the physical location; and storing the action hashtag in the database, wherein the ranked set of hashtags includes the action hashtag.

9. The computer-implemented method of claim 7, wherein the determining the one or more query hashtags is further based on identifying similar user queries and designating the one or more query hashtags as representative of the user query from the second user and the similar user queries.

10. The computer-implemented method of claim 7, further comprising:

determining a pattern based on a timestamp associated with the one or more query hashtags; and generating a pattern hashtag based on the pattern.

11. The computer-implemented method of claim 10, wherein the pattern is further based on sentiment analysis of the user query.

12. The computer-implemented method of claim 7, wherein the determining the one or more manual hashtags is further based on the first user providing the social post on behalf of the place of interest.

13. A system to generate a social post that includes hashtags, the system comprising:

one or more processors;

a location module stored on a memory and executable by the one or more processors, the location module configured to receive information indicative of a physical location of a first user device associated with a first user, identify a place of interest based on the information indicative of the physical location of the first user device, and determine a category associated with the place of interest;

a ranking module stored on the memory and executable by the one or more processors, the ranking module configured to generate a ranked set of hashtags, wherein one or more hashtags in the ranked set of hashtags describe one or more events that are time sensitive and the hashtags in the ranked set of hashtags are organized based on the one or more events that are time sensitive; and a user interface module stored on the memory and executable by the one or more processors, the user interface module configured to provide the ranked set of hashtags and to generate a social post for a social network, the social post including the ranked set of hashtags and information about the place of interest.

14. The system of claim 13, wherein the user interface module is further configured to generate a user interface that receives a custom place of interest defined by the first user.

15. The system of claim 13, wherein the user interface module is further configured to generate a user interface that includes a button that, upon selection, allows the first user to define a new hashtag that is stored as one of the one or more hashtags.

16. The system of claim 13, further comprising a social network module stored on the memory and executable by the one or more processors, the social network module configured to share the social post with one or more other users of the social network that are associated with the first user.

17. The system of claim 13, wherein:

the user interface module receives a user query from the first user that includes a request to search the hashtags for search results that match at least part of the user query; and the is further configured to generate a search results page that includes search results that are ordered based on matches between the user query and the hashtags.

18. The system of claim 13, wherein the user interface module is further configured to generate a user interface that allows a user to subscribe to one of the hashtags.

19. The system of claim 13, wherein the one or more hashtags that describe the one or more events that are time sensitive indicate that the one or more events are time sensitive by describing a duration of time that each of the one or more events is available or a current status of the one or more events.

20. The system of claim 13, wherein:

the one or more hashtags include user queries from one or more other users that are provided when other user devices associated with the one or more other users are within a threshold distance from the physical location; and generating the ranked set of hashtags is further based on a frequency of the user queries.

\* \* \* \* \*